(12) United States Patent
Ouchi

(10) Patent No.: US 7,653,223 B2
(45) Date of Patent: Jan. 26, 2010

(54) DIGITAL MULTIFUNCTION PERIPHERAL THAT HAS FINGERPRINT READER CAPABILITY

(75) Inventor: Takaharu Ouchi, Shizuoka-ken (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 702 days.

(21) Appl. No.: 11/249,657

(22) Filed: Oct. 12, 2005

(65) Prior Publication Data

US 2007/0081697 A1    Apr. 12, 2007

(51) Int. Cl.
   *G06K 9/00* (2006.01)
(52) U.S. Cl. .................................. 382/124; 340/5.53
(58) Field of Classification Search ............. 382/124; 340/5.53

See application file for complete search history.

(56) References Cited

U.S. PATENT DOCUMENTS 7,251,750 B2 * 7/2007 Oshima ................. 714/25
2003/0012415 A1 * 1/2003 Cossel .................. 382/124
2006/0245621 A1 * 11/2006 Uno ...................... 382/115

FOREIGN PATENT DOCUMENTS

| JP | 2003-123060 | 4/2003 |
|----|-------------|--------|
| JP | 2004-192024 | 7/2004 |

* cited by examiner

*Primary Examiner*—Charles Kim
*Assistant Examiner*—Stephen R Koziol
(74) *Attorney, Agent, or Firm*—SoCal IP Law Group LLP; Steven C. Sereboff; John E. Gunther

(57) ABSTRACT

In a digital multifunction peripheral that has a fingerprint reader capability, a display panel displays the duration of time from when the user places his finger immovably at the fingerprint read position until a carriage of the scanner actually starts reading the fingerprint. Consequently, the user becomes careful not to move his finger during the fingerprint scan or before or after the scan starts, and a rate of erroneous reading in fingerprint reading can be lowered.

15 Claims, 5 Drawing Sheets

US 7,653,223 B2

DIGITAL MULTIFUNCTION PERIPHERAL THAT HAS FINGERPRINT READER CAPABILITY

BACKGROUND OF THE INVENTION

1. Field of the Invention

The present invention relates to a digital multifunction peripheral, which is a computer peripheral unit, and more particularly, to a digital multifunction peripheral that has a fingerprint reader capability using a scan function provided for the digital multifunction peripheral.

2. Description of the Related Art

Japanese Official Gazette, JP-A-2003-123060 discloses an invention that relates to a method and an apparatus for biometrically identifying the user of an MFP (Multifunction Peripheral). The MFP proposed in this invention identifies the user by reading his fingerprint using the scanner function provided for the MFP itself. Before the user uses the MFP, he places his finger on the fingerprint read position provided on the top of the scanner cover of the MFP. Upon judging that the user's finger is placed on the read position with the use of a light or pressure sensor, the MFP reads the user's fingerprint using its own scanner function. The MFP then checks the fingerprint thus read against the fingerprints of the pre-registered authorized users.

In the related art as described above, however, the carriage of the scanner has to be moved to the specified position for reading the fingerprint first, and then the fingerprint is read as the carriage moves. Hence, the user has to keep his finger placed immovably in a reliable manner while the carriage is moving since the user places his finger at the read position until the fingerprint reading ends. The user therefore needs to become aware of the instant at which the fingerprint reading starts and the instant at which the reading is completed. In the related art, however, it is difficult for the user to become aware of the instant at which the fingerprint reading starts because the fingerprint reading starts when it is triggered by the automatic detection of the finger by the sensor. Moreover, in the related art, it takes time from when the sensor detects the finger with the lamp indicating an operating state being lit ON until the carriage reaches the effective image region (that is, in the vicinity of the finger) because the fingerprint is read using the scanner function of the MFP.

This makes it more difficult for the user to become aware of the instant at which the fingerprint reading starts. Under these circumstances, the reading may fail because the user unintentionally moves his finger during the fingerprint reading or before or after the reading starts.

In addition, the read surfaces are not necessarily the same for the case of reading the fingerprint and for the case of reading normal documents. Hence, there is a problem that when the focus of the optical system in the scanner is adjusted to one of the read surfaces, the correct focus is not achieved on the other read surface.

BRIEF DESCRIPTION OF THE DRAWING

The accompanying drawings, which are incorporated in and constitute a part of the specification, illustrate presently preferred embodiments of the invention.

DETAILED DESCRIPTION OF THE INVENTION

Hereinafter, embodiments of the present invention will be explained in detail with reference to the attached drawings.

Figure 1:
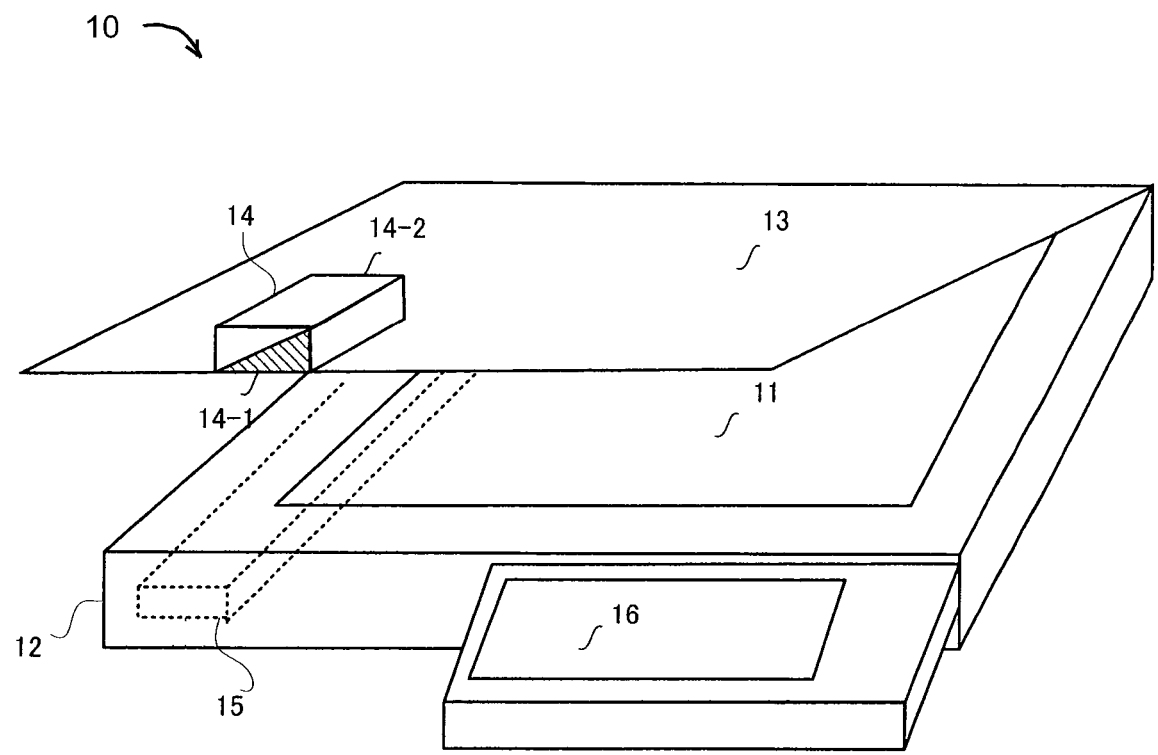
FIG. 1 is a view showing an outward appearance of a digital multifunction peripheral that has a fingerprint reader capability according to one embodiment of the invention.

FIG. 1 is a view showing an outward appearance of a digital multifunction peripheral that has a fingerprint reader capability according to one embodiment of the invention. The digital multifunction peripheral that has the fingerprint reader capability of FIG. 1 incorporates an image scanner 10. The image scanner 10 includes a box-shaped scanner main body 12 having a document glass 11 on which a document to be scanned is placed, a scanner cover 13 provided above the document glass 11 of the scanner main body 12, and a finger insert portion 14 provided to the scanner cover 13. The finger insert portion 14 comprises a fingerprint read window 14-1 provided on the scanner cover 13, and a window cover 14-2 that not only covers the fingerprint read window 14-1 but also defines a space into which the finger is inserted. Although it is not shown in the drawing, the finger insert portion 14 includes a sensor portion comprising a light or pressure sensor that detects the finger inserted into the window cover 14-2.

As will be described below, a carriage 15, on which a light source and a photoelectric converter portion are mounted, is provided inside the scanner main body 12. The carriage 15 is provided so that it is movable inside the scanner main body 12 along the surface of the document glass 11 by a carriage driving motor described below. Also, a display panel 16 composed of, for example, a liquid crystal panel, is provided for the scanner main body 12.

Figure 2:
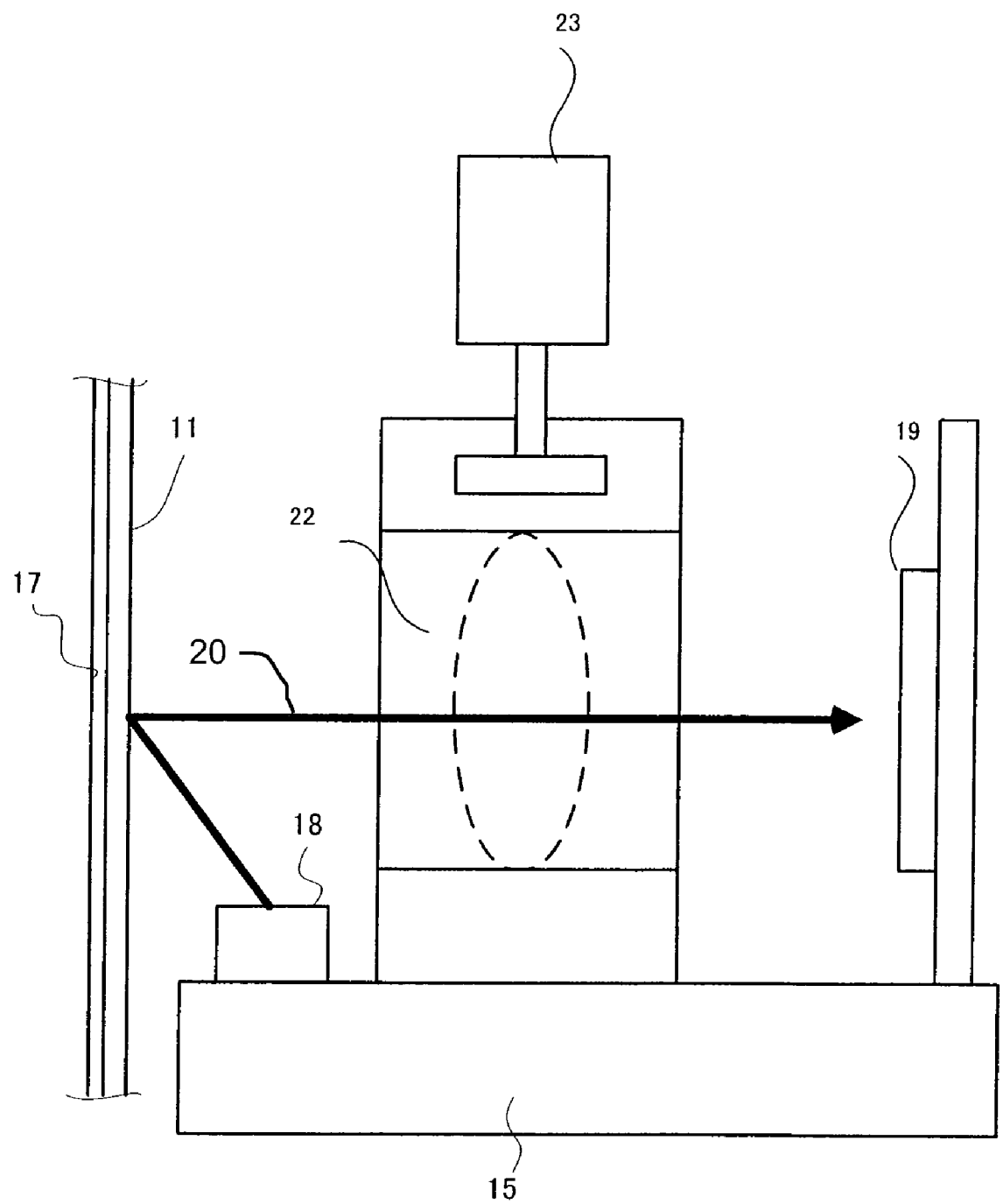
FIG. 2 is a view schematically showing a concrete configuration of a carriage shown in FIG. 1.

FIG. 2 is a view schematically showing the configuration of the optical system mounted on the carriage 15. More specifically, the carriage 15 mounts a light source 18 that illuminates, for example, a document surface 17, which is placed on the document glass 11 as an object to be scanned, an image read sensor 19, an image forming lens 22 that forms an image of reflected light 20 from the document surface 17 on the surface of the image read sensor 19, and a focus adjusting motor 23 for the lens 22.

As is shown in FIG. 1, the fingerprint read window 14-1 as well as the fingerprint read window cover 14-2 are provided for the scanner cover 14-2. When the fingerprint is scanned, the position of the finger is fixed at a position distant from the document glass 14 by a distance comparable to the thickness of the finger read window 14-1. Hence, two states, that is, a state where the focus is achieved on the document surface 17 on the document glass surface 11 and a state where the focus is achieved on the fingerprint read window surface 14-1, are produced using a focus adjusting motor 23 for the image forming lens 22 as shown in FIG. 2. When the fingerprint is read, the fingerprint scan is performed while the focus is achieved on the fingerprint read window surface 14-1. During the normal scan operation, scan is performed while the focus is achieved on the document surface 17 on the document glass surface 11. The image read sensor 19 is therefore able to obtain an image of the object to be scanned in a state where the focus is achieved in either case.

Figure 3:
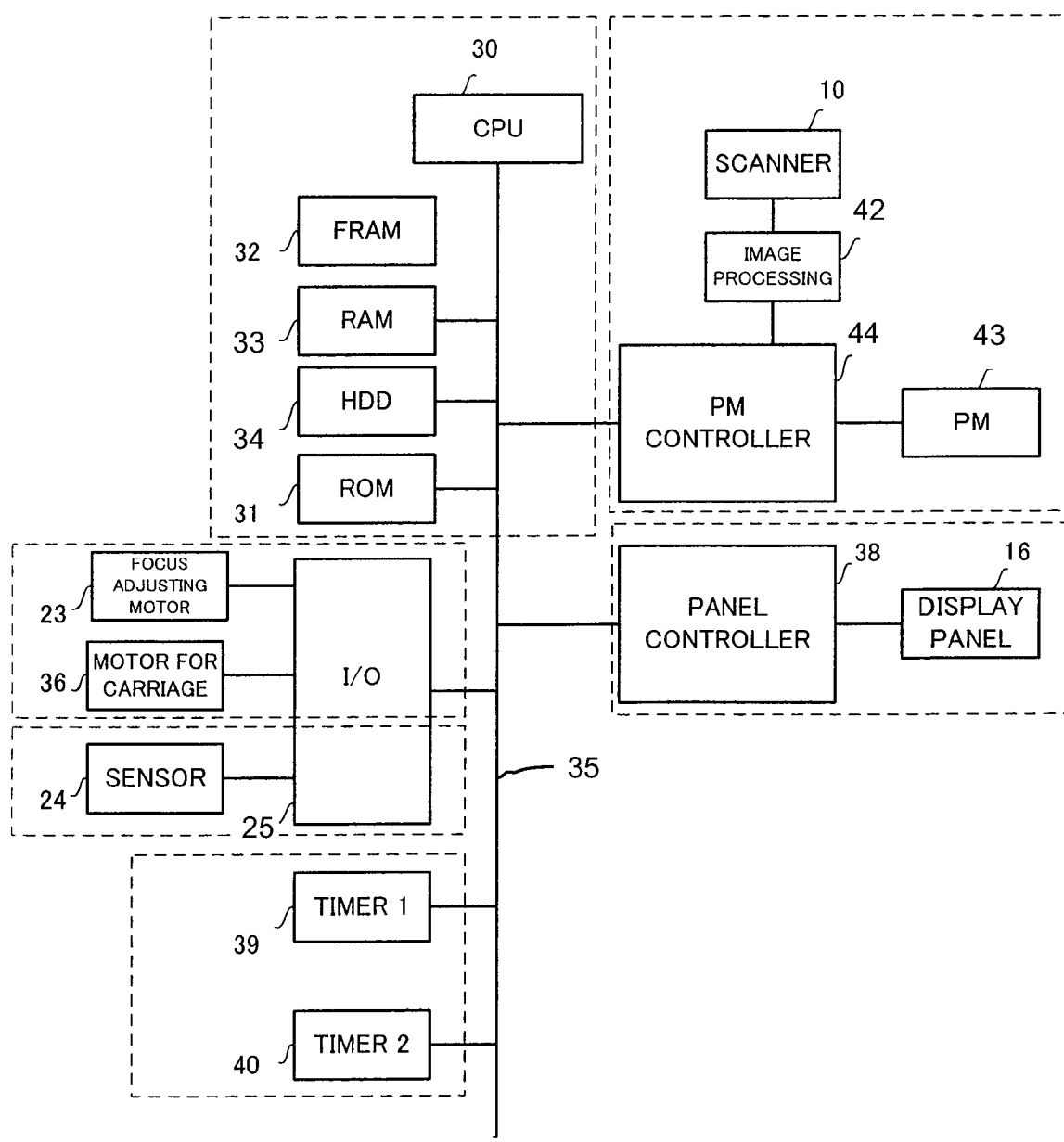
FIG. 3 is a block diagram showing a configuration of internal processing in the digital multifunction peripheral that has the fingerprint reader capability according to one embodiment of the invention.

FIG. 3 is a block diagram showing a configuration of internal processing in the digital multifunction peripheral that has the fingerprint reader capability according to one embodiment of the invention. In the digital multifunction peripheral, a ROM 31 having stored a control program used for operations of a CPU 30, an FRAM (Ferroelectric Random Access Memory) 32 to save set data, such as an operation time of the carriage, a RAM 33 used for computations of an active program, and an HDD 34 having stored fingerprint image data of the pre-registered users are connected to the CPU 30 via a common bus 35. A carriage driving motor 36 that causes the carriage 15 of the scanner 10 to perform a scanning operation along the surface of the document glass 11, the focus adjusting motor 23, and a sensor 24 used to detect the insertion of the finger into the finger insert portion 14 are connected to the CPU 20 via an input/output interface circuit (I/O) 25 and the common bus 35.

An image processing circuit 42 that extracts bioinformation from image data sent from the scanner 10 and a page memory (PM) 43 that stores and edits the image data processed in the circuit 42 are connected to the CPU 30 via a PM controller 44 that controls the PM 43 and the common bus 35.

Likewise, a display panel 16 used in the manipulation portion of the scanner 10 is connected to the CPU 30 via a panel controller 38 that controls the display panel 16 and the common bus 35.

A first timer 39 is a timer to set the duration of time from when the user set his finger in the finger insert portion 14 until the carriage 15 reaches the fingerprint read window 14-1. Also, a second timer 40 is a timer to set the duration of time from when the user set his finger in the finger insert portion 14 until a command to start moving for scan to the carriage 15 is issued. The first and second timers 39 and 40 are independently connected to the CPU 30 via the common bus 35.

Figure 4:
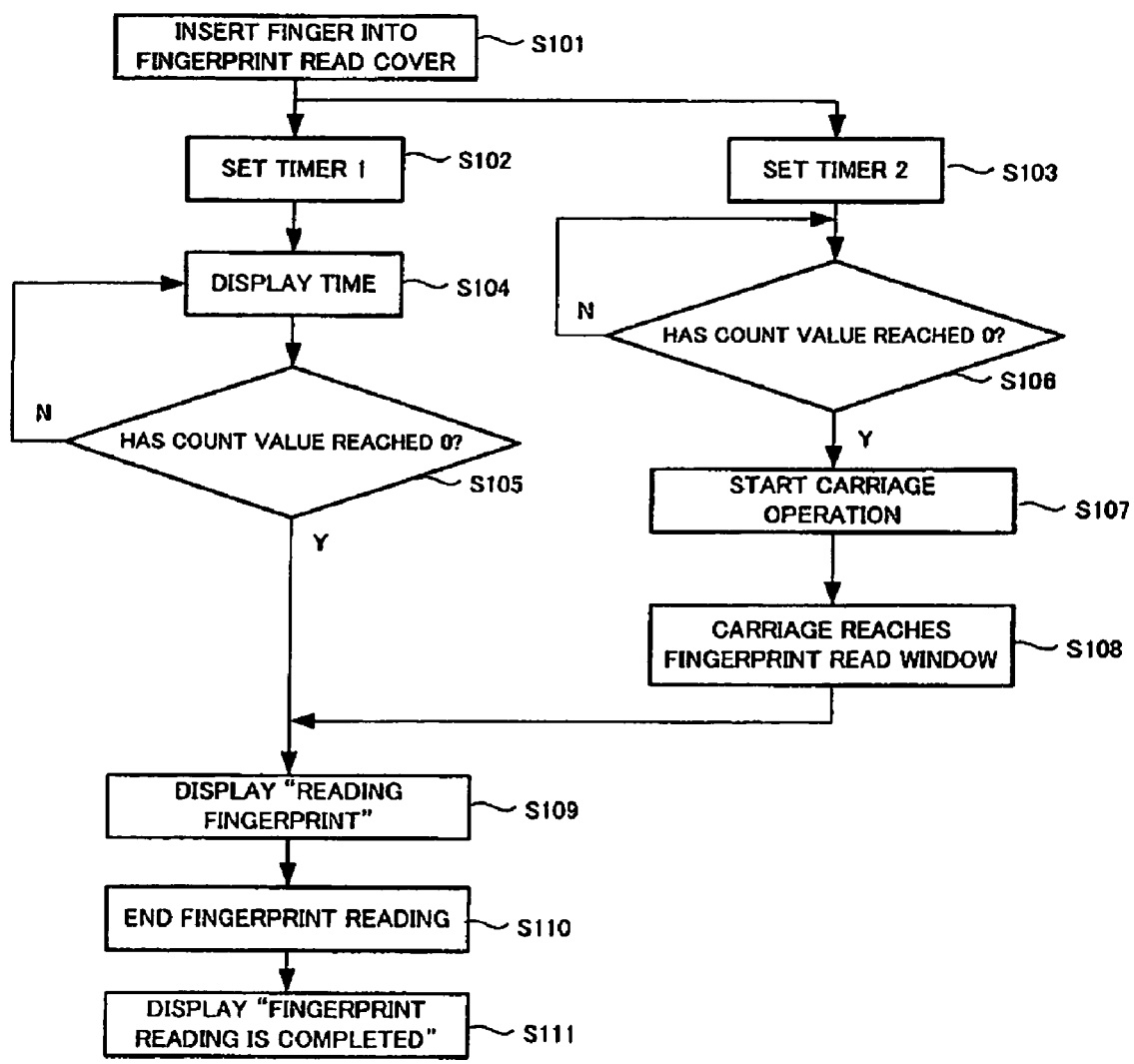
FIG. 4 is a flowchart detailing the fingerprint read operation of the digital multifunction peripheral that has the fingerprint reader capability shown in FIG. 1.

FIG. 4 is a flowchart showing a fingerprint read operation of the digital multifunction peripheral according to one embodiment of the invention configured as described above.

The user who wishes to use the MFP goes through user identification before he uses the MFP. The user therefore inserts his finger into the finger insert portion 14 for the fingerprint reading (FIG. 1) provided on the top of the scanner cover 13 forming the MFP in Step S101. When the finger is inserted into the finger insert portion 14, the finger is detected by the sensor 24 (FIG. 3) provided inside the finger insert portion 14. This causes the fingerprint read operation by the scanner 10 to start.

Figure 5:
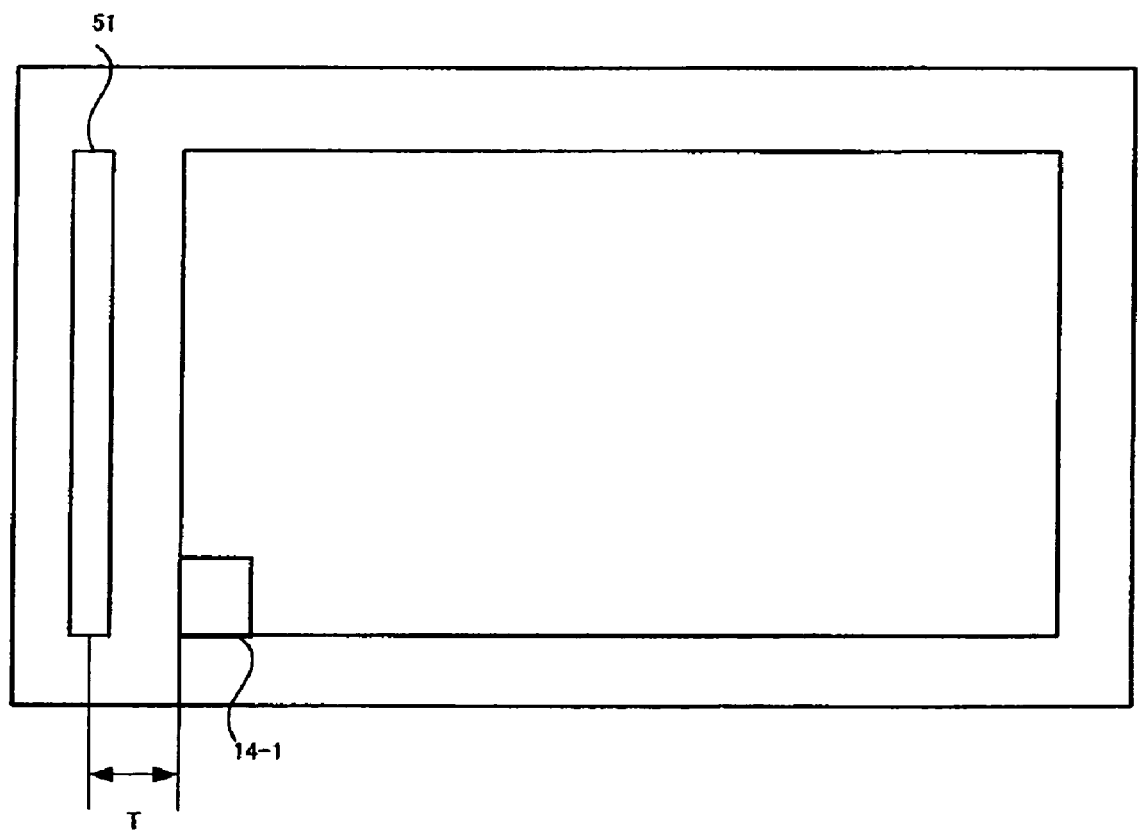
FIG. 5 is a conceptual view used to describe the carriage operation for the fingerprint reading of the digital multifunction peripheral that has the fingerprint reader capability shown in FIG. 1.

Times are set in the first timer 39 and the second timer 40 in Steps S102 and S103, respectively. The first timer 39 is set to the duration of time from when the finger detection sensor 23 detects the finger until the instant at which the carriage 15 reaches the fingerprint read window 14-1, that is, when the scanner starts reading the fingerprint. Let this time be T1. The second timer 40 is set to the duration of time from when the finger detect sensor 23 detects the finger until the command signal to start moving for scan is issued to the carriage 15. Let this time be T2. As is shown in FIG. 5, the time T2 is a time obtained by subtracting a movement time T needed for the carriage 15 to reach the fingerprint read window 14-1 from a stand-by position 51 from the time T1 set in the first timer 39. These times therefore establish a relation expressed by the following equation:

$$T1 - T = T2$$

When T1 and T2 are set in the first timer 39 and the second timer 40, respectively, these timers start the countdown (or countup) simultaneously, and the count values are monitored in Steps S105 and S106, respectively. In this instance, the count value of the first timer 39 is displayed on the display panel 16 in Step S104. Under such a control, the countdown numeral value is displayed on the display panel 16. The instant at which the time of the second timer 40 reaches 0 later in Step S107, the movement operation for scan of the carriage 15 is started. By starting the control of the carriage 15 at this timing, the carriage 15 is allowed to reach the fingerprint read window 14-1 at the instant at which the value of the first timer 39 reaches 0 in Step S108.

As are shown in Steps S105 and S106, the flowchart shows a case where the polling is adopted to monitor the timers by way of example; however, the interruption processing may be adopted instead. The time set by the user is directly set in the first timer 39, and the time set in the second timer 40 is computed inside the CPU 30 as has been described. The CPU 30 acknowledges that the time set in the second timer 40 has passed from a polling or interruption signal, and outputs a driving start signal to the carriage driving motor 36 via the I/O 25, which causes the carriage 15 to start to operate. The carriage 15 reaches the read window 14-1 by the time the time set in the first timer 39, T1, has passed. These set values are saved, for example, in the FRAM 32, which is a non-volatile memory, so that they are retained after the power supply is turned off.

In Step S109, the display panel 16 displays "Reading Fingerprint" after the carriage 15 reached the fingerprint read window 14-1. The fingerprint reading actually ends in Step S110, and the display panel 16 displays "Fingerprint Reading Is Completed" and the like in Step S111.

The image processing circuit 42 shown in FIG. 3 extracts bioinformation from the image data sent from the scanner 10, and stores the bioinformation into the page memory (PM) 43. The user identification is performed by checking the bioinformation against the fingerprints of the pre-registered authorized users stored in the HDD 34. The user is allowed to use the MFP only after his identity is confirmed in the manner as above.

According to this embodiment of the invention, it becomes easier for the user to become aware of the instant at which the fingerprint reading starts by displaying on the display panel 16 the countdown of the time, for example, it takes to actually start the fingerprint reading since the user placed his finger in the fingerprint insert portion 14. The user therefore becomes careful not to move his finger during the scan or before or after the scan of the fingerprints starts. Accurate user identification based on the exact fingerprint reading is thus achieved.

Also, according to this embodiment of the invention, it is possible to change as desired the duration of time from when the finger is inserted into the fingerprint insert portion 14 until fingerprint reading actually starts, by changing the times T1 and T2 that are set in the first timer 39 and the second timer 40, respectively. This allows the user to set the optimal time, and thereby enables exact fingerprint reading to be achieved by changing the times T1 and T2 that are set in the first timer 39 and the second timer 40, respectively.

Further, because the focus is switched when the fingerprint is read, the rate of failure in fingerprint reading can be lowered.

Additional advantages and modifications will readily occur to those skilled in the art. Therefore, the invention in its broader aspects is not limited to the specific details and representative embodiments shown and described herein. Accordingly, various modifications may be made without departing from the sprit or scope of the present invention.

For example, in the embodiment above, the document glass 11 is used to place thereon a document to be scanned. However, a glass plate is not necessarily used, and a transparent resin plate may be used instead. The term "document glass" is therefore replaced with another term "document placement window".

Also, the embodiment above is configured in such a manner that the scanning operation of the scanner 10 is started automatically when the sensor 24 detects the insertion of the finger in the fingerprint insert portion 14. However, instead of starting the scan automatically, the user may start the scan by pressing a button after he inserted his finger in the fingerprint insert portion 14. For example, the display panel 16 may display a scan start button, so that the scan is started when the user touches this button. When configured in this manner, the user can choose the timing of the fingerprint scan as he desires after he inserted his finger in the fingerprint insert portion 14. This enables more exact fingerprint reading to be achieved.

Also, in the embodiment described above, the duration of time from when the finger is inserted into the fingerprint insert portion 14 until fingerprint reading actually starts is counted down and shown in the form of numerical values. The display is not limited to this configuration, and the time may be counted up and shown in the form of numerical values. Further, the numerical values may be replaced with a figure representing, for example, a bar that increases/decreases in length with time, or a figure representing the second hand of the clock.

What is claimed is:

1. A digital multifunction peripheral that has a fingerprint reader capability, comprising:
    an image scanner; and
    a processor portion that controls the digital multifunction peripheral including the image scanner; wherein the image scanner further includes:
    a scanner main body having a document glass on which a document to be scanned is placed;
    a scanner cover provided above the document glass of the scanner main body;
    a finger insert portion provided on the scanner cover;
    a sensor that detects a finger inserted in the finger insert portion;
    a carriage, on which a light source and a photoelectric converter portion are mounted, provided so as to be movable inside the scanner main body;
    a carriage moving mechanism provided inside the scanner main body to move the carriage to a position of the finger insert portion along the document glass surface;
    an image processing portion that extracts personal identification information from a read image of the scanner;
    a display portion that displays the duration of time from when the user inserts his finger in the finger insert portion until the carriage of the scanner starts image reading of the finger insert portion; and
    a time set portion that sets as desired the duration of time from when the sensor detects the finger until the carriage of the scanner reaches a fingerprint read position, the time set portion including a first timer to set the duration of time from when the sensor detects the finger until the carriage reaches the fingerprint read position, and a second timer to set the duration of time from when the sensor detects the finger until a command to start reading the fingerprint is issued to the carriage, wherein:
    let T1 and T2 be times set in the first timer and the second timer, respectively, and T be a time needed for the carriage of the scanner to reach the finger insert portion from a standby position, then the times establish a relation substantially expressed by an equation: $T1-T2=T$.

2. The digital multifunction peripheral that has a fingerprint reader capability as set forth in claim 1, wherein:
    the finger insert portion includes a fingerprint read window provided on the scanner cover, and a window cover that not only covers the fingerprint read window but also defines a space in which the finger is inserted; and
    the display portion includes a liquid crystal display panel that displays a countdown of the duration of time for which the carriage of the scanner reaches the finger insert portion.

3. The digital multifunction peripheral that has a fingerprint reader capability as set forth in claim 2, wherein:
    the sensor portion that detects insertion of the finger in the finger insert portion includes a light or pressure sensor, and an input/output circuit connected to the sensor.

4. The digital multifunction peripheral that has a fingerprint reader capability as set forth in claim 3, wherein:
    the processor portion that controls functions of the digital multifunction peripheral includes:
    a CPU;
    a ROM that has stored a program used to control the CPU;
    a RAM that is used for a computation while the program is run;
    an FRAM that saves set data regarding an operation time of the carriage; and
    an HDD that has stored registered fingerprint image data.

5. The digital multifunction peripheral that has a fingerprint reader capability as set forth in claim 4, wherein the image processing portion that processes a fingerprint read image of the scanner includes:
    an image processing circuit that extracts bioinformation from image data sent from the scanner;
    a page memory that temporarily stores the image data processed by the image processing circuit; and
    a PM controller that controls the page memory.

6. The digital multifunction peripheral that has a fingerprint reader capability as set forth in claim 5, wherein:
    the bioinformation is fingerprint information.

7. The digital multifunction peripheral that has a fingerprint reader capability as set forth in claim 6, wherein:
    the scanner further includes a focus switching mechanism that switches a focus to an object from which a fingerprint is read when the carriage has moved to the fingerprint read position.

8. The digital multifunction peripheral that has a fingerprint reader capability as set forth in claim 7, wherein the focus switching mechanism includes:
    a motor that causes the carriage of the scanner to operate;
    a motor that switches the focus to the object to be scanned; and
    an input/output circuit that controls the motors.

9. The digital multifunction peripheral that has a fingerprint reader capability as set forth in claim 8, wherein:
    the display portion of the scanner includes a display panel provided to the scanner main body and a panel controller that controls the display panel.

10. The digital multifunction peripheral that has a fingerprint reader capability as set forth in claim 1, wherein:
    the display portion is a liquid crystal display panel that displays the duration of time for which the carriage of the scanner reaches the finger insert portion in a form of a figure.

11. The digital multifunction peripheral that has a fingerprint reader capability as set forth in claim 1, wherein:

the time set in the first timer, T1, can be changed by changing the time set in the second timer, T2, to satisfy the equation.

12. The digital multifunction peripheral that has a fingerprint reader capability as set forth in claim 1, wherein:
a movement of the carriage of the scanner to the finger insert portion from the standby position is started automatically when the sensor portion detects the insertion of the finger in the finger insert portion.

13. The digital multifunction peripheral that has a fingerprint reader capability as set forth in claim 1, wherein:
a movement of the carriage of the scanner to the finger insert portion from the standby position is started by a button manipulation performed after the finger is inserted in the finger insert portion.

14. The digital multifunction peripheral that has a fingerprint reader capability as set forth in claim 13, wherein:
the button manipulation is performed using a button displayed on the display portion.

15. A method for reading a fingerprint in a digital multifunction peripheral that has a fingerprint reader capability, comprising:

inserting a finger into a finger insert portion provided on a scanner cover;

detecting the finger inserted in the finger insert portion by a sensor;

moving a carriage, on which a light source and a photoelectric converter portion are mounted, to a position of the finger insert portion along a document glass surface;

setting a time T1 required for the carriage to reach a fingerprint read position after the sensor has detected the finger inserted in the finger insert portion; and setting a time T2 required to give a fingerprint reading start command after the sensor has detected the finger inserted in the finger insert portion, wherein the times establish a relationship substantially expressed by an equation:

$$T1 - T = T,$$

where T is a time needed for the carriage to reach the insert portion from a standby position.

* * * * *